United States Patent
Hu et al.

(10) Patent No.: US 10,484,105 B2
(45) Date of Patent: Nov. 19, 2019

(54) METHOD AND APPARATUS FOR CONSTRUCTING WIRELESS POSITIONING FEATURE LIBRARY

(71) Applicant: Huawei Technologies Co., Ltd., Shenzhen (CN)

(72) Inventors: Xiaofeng Hu, Shanghai (CN); Jiehua Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/287,738

(22) Filed: Feb. 27, 2019

(65) Prior Publication Data

US 2019/0260480 A1 Aug. 22, 2019

Related U.S. Application Data

(63) Continuation of application No. PCT/CN2016/097640, filed on Aug. 31, 2016.

(51) Int. Cl.
| | |
|---|---|
| *H04W 24/00* | (2009.01) |
| *H04B 17/11* | (2015.01) |
| *H04B 17/27* | (2015.01) |
| *H04W 64/00* | (2009.01) |
| *H04B 17/327* | (2015.01) |
| *G01S 19/47* | (2010.01) |

(52) U.S. Cl.
CPC ............. *H04B 17/11* (2015.01); *G01S 19/47* (2013.01); *H04B 17/27* (2015.01); *H04B 17/327* (2015.01); *H04W 64/003* (2013.01)

(58) Field of Classification Search
None
See application file for complete search history.

(56) References Cited

U.S. PATENT DOCUMENTS

| | | | |
|---|---|---|---|
| 2009/0286549 A1 | 11/2009 | Canon et al. | |
| 2016/0021503 A1* | 1/2016 | Tapia | H04W 24/02 455/456.1 |
| 2016/0183050 A1* | 6/2016 | Yiu | H04W 4/021 455/456.1 |
| 2017/0118592 A1* | 4/2017 | Patel | H04W 4/021 |
| 2018/0014351 A1* | 1/2018 | Coutinho | H04W 84/06 |

FOREIGN PATENT DOCUMENTS

| | | |
|---|---|---|
| CN | 101572856 A | 11/2009 |
| CN | 102066969 A | 5/2011 |
| CN | 102098780 A | 6/2011 |
| CN | 104754735 A | 7/2015 |

OTHER PUBLICATIONS

Lilong, et al., "Study of the Comparision on GPS and BDS Multipath Effects", Urban Geotechnical Investigation and Surveying, No. 1,1672-8262 (2016) Jan. 5, 2006, 6 pages (Feb. 2016).

* cited by examiner

*Primary Examiner* — Erika A Washington
(74) *Attorney, Agent, or Firm* — Leydig, Voit & Mayer, Ltd.

(57) ABSTRACT

A method for constructing a wireless positioning feature library includes: obtaining a wireless positioning training data set, where the wireless training data set includes a plurality of pieces of training data; performing clustering and merging on the plurality of pieces of training data one by one; and determining wireless positioning feature data based on at least one piece of sample data obtained after the merging.

20 Claims, 8 Drawing Sheets

METHOD AND APPARATUS FOR CONSTRUCTING WIRELESS POSITIONING FEATURE LIBRARY

CROSS-REFERENCE TO RELATED APPLICATIONS

This application is a continuation of International Application No. PCT/CN2016/097640, filed on Aug. 31, 2016, the disclosure of which is hereby incorporated by reference in its entirety.

TECHNICAL FIELD

This application relates to the field of data processing technologies, and in particular, to a method and an apparatus for constructing a wireless positioning feature library.

BACKGROUND

With rapid development of wireless communications technologies, various wireless terminals are widely popularized among mass users. The large-scale popularization of the various wireless terminals leads to various location based services that are based on wireless positioning, such as shopping mall indoor navigation, accurate location advertisement push, real-time location monitoring for the aged and children.

Currently, a most common solution in wireless positioning technologies is radio signal feature matching positioning, or is referred to as fingerprint matching positioning, and an implementation process includes a training phase and a positioning phase. In the training phase, a location based service (LBS) device collects cell level information measured by user equipment (UE) at a specific location. Herein, the cell level information is referred to as positioning data. Each piece of positioning data includes location data and a received signal strength indicator (RSSI) of at least one cell of UE. Positioning data sent by a large quantity of UEs at a same location or different locations constitutes a wireless positioning feature library. In the positioning phase, an LBS server receives an RSSI of at least one cell that is reported by UE that needs to be positioned. The LBS server compares the RSSI reported by the UE with data in the wireless positioning feature library according to a matching algorithm, and obtains a location of the UE based on a comparison result. It can be learned that accuracy and stability of the data in the wireless positioning feature library constructed in the training phase directly affect a positioning effect of the positioning phase.

In an actual process of collecting data of a wireless positioning feature library, a radio environment is complex and changeable. To resist noise impact in the environment, when constructing the wireless positioning feature library, an LBS device processes collected positioning data by using a rasterization policy. The LBS device performs x-meter-based rasterization on location data. After the rasterization, the LBS device adds RSSIs of a same cell in all pieces of positioning data whose location data falls within a same raster together, and calculates an average, to obtain an RSSI of each cell of the current raster.

In the wireless positioning feature library for which the rasterization policy is used, location data in positioning data indicates an area range rather than point data. As shown in FIG. 1, when UE is positioned based on this characteristic by using the wireless positioning feature library for which the rasterization policy is used, a location of the UE is indicated by using a raster. When the UE is in a moving state, a moving track of the UE is a track formed by a series of rasters. For example, in FIG. 1, rasters with an oblique line form the moving track of the UE, causing distortion of a positioning location and the moving track of the UE.

SUMMARY

Embodiments of the present invention provide a method and an apparatus for constructing a wireless positioning feature library, to improve wireless positioning accuracy.

According to a first aspect, an embodiment of the present invention provides a method for constructing a wireless positioning feature library, including:

obtaining a wireless positioning training data set, where the wireless training data set includes a plurality of pieces of training data;

performing clustering and merging on the plurality of pieces of training data one by one, to obtain at least one piece of sample data; and determining wireless positioning feature data based on the at least one piece of sample data, where performing clustering and merging on any piece of training data A in the plurality of pieces of training data includes:

when a preset sample data set includes at least one piece of sample data, determining, from the at least one piece of sample data, sample data that falls within a preset range of the training data A;

determining, from the sample data that falls within the preset range of the training data A, sample data B with highest similarity to the training data A;

merging the training data A and the sample data B to form new sample data C; and replacing the sample data B with the sample data C, and adding the sample data C to the sample data set.

In this implementation, based on similarity between training data and sample data, clustering and merging are performed on the training data and the sample data of a same or similar type within a preset range, to obtain new sample data. Each piece of sample data obtained after clustering and merging are performed on all pieces of training data in a training data set represents one type of similar positioning data. Compared with a prior-art manner in which location data is indicated by using a raster, in this embodiment of the present invention, wireless positioning feature data is corresponding to a location point that can better reflect a real location and a real track of UE than a positioning range indicated by using a raster. Therefore, a prior-art problem of positioning track distortion is alleviated.

In this implementation, according to the law of large numbers, if clustering and merging are performed on location data in sample data for a larger quantity of times, location data in obtained wireless positioning feature data can better reflect a real location, and an RSSI of each cell in the wireless positioning feature data is more real.

In a possible implementation, the preset range is a positioning error range of training data. For example, location data in the training data is obtained based on a Global Positioning System (GPS), and the preset range may be a positioning error of the GPS. In this implementation of the present invention, clustering and merging are performed on training data within the positioning error range of the training data. Therefore, not only impact of a GPS positioning error on precision of a wireless positioning feature library can be eliminated, but also radio signal fading can be resisted. In addition, fingerprint information of different attributes in a radio environment is completely retained.

In a possible design, the training data and the sample data each include location data, at least one cell identifier, and an RSSI that is in a one-to-one correspondence with the at least one cell identifier.

The sample data further includes an accumulation count of the location data and an accumulation count of an RSSI of each cell.

In this implementation, when clustering and merging are performed on the training data and the sample data, an accumulated sum and an accumulation count of location data are recorded, and an accumulated sum and an accumulation count of RSSIs of each cell are further recorded. After a clustering and merging calculation is performed on all pieces of training data, an average of location data in finally obtained sample data and an average of RSSIs of each cell in the final obtained sample data are calculated, to ensure accuracy of location data and an RSSI of each cell in finally obtained positioning feature data.

In a possible design, the determining, from the at least one piece of sample data, sample data that falls within a preset range of the training data A includes:

determining, from the at least one piece of sample data based on location data in the at least one piece of sample data and location data in the training data A, the sample data that falls within the preset range of the training data A.

In a possible design, after the determining, from the at least one piece of sample data, sample data that falls within a preset range of the training data A, the method further includes:

determining to-be-merged sample data from the sample data that falls within the preset range of the training data A, where a ratio of a quantity of same cell identifiers included in the to-be-merged sample data and the training data A to a total quantity of cell identifiers included in the training data A is greater than or equal to a first preset threshold.

In a possible design, the determining, from the sample data that falls within the preset range of the training data A, sample data B with highest similarity to the training data A includes:

determining, from the to-be-merged sample data, the sample data B with the highest similarity to the training data A.

In a possible design, determining similarity between sample data and training data includes:

calculating a root mean square of the training data and the sample data according to a formula $$RMS = \sqrt{\frac{\sum_{i=1}^{m}\left(\frac{sumRSSI_i}{sumM_i} - Rssi_i\right)^2}{m}},$$

where a smaller root mean square value indicates higher similarity between the training data and the sample data; and in the formula, $Rssi_i$ is an RSSI of an $i^{th}$ cell in the training data, $sumRSSI_i$ is an RSSI of an $i^{th}$ cell in the sample data, $sumM_i$ is an accumulation count in the sample data, and m is a quantity of same cell identifiers included in the training data and the sample data.

In a possible design, the merging the training data A and the sample data B to form new sample data C includes:

determining whether the similarity between the training data A and the sample data B is greater than or equal to a second preset threshold; and when the similarity between the training data A and the sample data B is greater than or equal to the second preset threshold, merging the training data A and the sample data B to form the new sample data.

In a possible design, the merging the training data A and the sample data B to form new sample data C includes:

adding the location data in the training data A and location data in the sample data B together, to obtain location data in the sample data C;

correspondingly adding RSSIs corresponding to a same cell identifier in the training data A and the sample data B together, and keeping an RSSI corresponding to a different cell identifier in the training data A and the sample data B unchanged, to obtain an RSSI of each cell of the sample data C; and increasing, by 1, an accumulation count of the received signal strength indicators corresponding to the same cell identifier included in the training data A and the sample data B, keeping an accumulation count of a received signal strength indicator corresponding to a cell identifier that is included only in the sample data B unchanged, recording, as 1, an accumulation count of a received signal strength indicator corresponding to a cell identifier that is included only in the training data A, and increasing, by 1, an accumulation count corresponding to the location data, to separately obtain an accumulation count of the received signal strength indicator of each cell and an accumulation count of the location data in the sample data C.

In a possible design, when the preset sample data set is empty, or when the sample data that falls within the preset range of the training data A and that is determined from the at least one piece of sample data is empty, or when all cell identifiers included in the sample data that falls within the preset range of the training data A and that is determined from the at least one piece of sample data are different from all cell identifiers in the training data A, or when a ratio of a quantity of same cell identifiers included in the sample data that falls within the preset range of the training data A and the training data A to the quantity of cell identifiers included in the training data A is less than the first preset threshold, the method further includes:

determining the training data A as new sample data D, where location data, a cell identifier, and an RSSI corresponding to the cell identifier in the sample data D are all the same as those in the training data A, and both an accumulation count of the location data and an accumulation count of an RSSI of each cell in the sample data D are recorded as 1.

In a possible design, the determining wireless positioning feature data based on the at least one piece of sample data includes:

for each piece of sample data, dividing location data in the sample data by an accumulation count corresponding to the location data, to obtain location data in wireless positioning feature data corresponding to the sample data; and for each piece of sample data, dividing an RSSI corresponding to each cell identifier in the sample data by an accumulation count corresponding to each cell, to obtain an RSSI of each cell in the wireless positioning feature data corresponding to the sample data.

According to a second aspect, to implement a method for constructing a wireless positioning feature library in the first aspect, an embodiment of the present invention provides an apparatus for constructing a wireless positioning feature library, and the apparatus has a function of implementing a method for constructing a wireless positioning feature library. The function may be implemented by hardware, or may be implemented by hardware by executing corresponding software. The hardware or the software includes one or more modules corresponding to the function.

In a possible design, the apparatus includes a plurality of function modules, configured to implement any method in the first aspect. In this implementation, based on similarity between training data and sample data, clustering and merging are performed on the training data and the sample data of a same or similar type within a preset range, to obtain new sample data. Each piece of sample data obtained after clustering and merging are performed on all pieces of training data in a training data set represents one type of similar positioning data. Compared with a prior-art manner in which location data is indicated by using a raster, in this embodiment of the present invention, wireless positioning feature data is corresponding to a location point that can better reflect a real location and a real track of UE than a positioning range indicated by using a raster. Therefore, a prior-art problem of positioning track distortion is alleviated.

In a possible design, the apparatus for constructing a wireless positioning feature library includes an obtaining unit, a clustering and merging unit, and a determining unit, where the obtaining unit is configured to obtain a wireless positioning training data set, where the wireless training data set includes a plurality of pieces of training data;

the clustering and merging unit is configured to perform clustering and merging on the plurality of pieces of training data one by one, to obtain at least one piece of sample data; and the determining unit is configured to determine wireless positioning feature data based on the at least one piece of sample data, where that the clustering and merging unit performs clustering and merging on any piece of training data A in the plurality of pieces of training data includes:

when a preset sample data set includes at least one piece of sample data, determining, from the at least one piece of sample data, sample data that falls within a preset range of the training data A;

determining, from the sample data that falls within the preset range of the training data A, sample data B with highest similarity to the training data A;

merging the training data A and the sample data B to form new sample data C; and replacing the sample data B with the sample data C, and adding the sample data C to the sample data set.

According to a third aspect, an embodiment of the present invention provides a computer storage medium, configured to store a computer software instruction used by the foregoing apparatus for constructing a wireless positioning feature library, and the computer software instruction includes a program designed for performing the foregoing aspects.

In technical solutions of constructing a wireless positioning feature library in embodiments of the present invention, a problem of positioning track distortion can be alleviated, and wireless positioning accuracy can be improved.

BRIEF DESCRIPTION OF DRAWINGS

To describe technical solutions in this application more clearly, the following briefly describes the accompanying drawings. A person of ordinary skill in the art can further obtain other drawings based on these accompanying drawings without creative efforts.

DESCRIPTION OF EMBODIMENTS

A method for constructing a wireless positioning feature library that is provided in the present invention may be applied to a first phase of positioning by various wireless positioning systems, namely, a phase for constructing a wireless positioning feature library. The wireless positioning systems include but are not limited to systems such as a 2G system, a 3G system, a Long Term Evolution (LTE) system, a Wireless Fidelity (Wi-Fi) system, and a wireless local area network (WLAN) system.

A method for constructing a wireless positioning feature library in embodiments of the present invention is described below in detail with reference to an exemplary positioning system. It should be noted that network architectures and service scenarios described in embodiments of the present invention are used to more clearly describe technical solutions in embodiments of the present invention, but constitute no limitation on technical solutions provided in embodiments of the present invention. A person of ordinary skill in the art may be aware that as the network architectures evolve and new service scenarios emerge, technical solutions provided in embodiments of the present invention are also applicable to similar technical problems.

Figure 2:
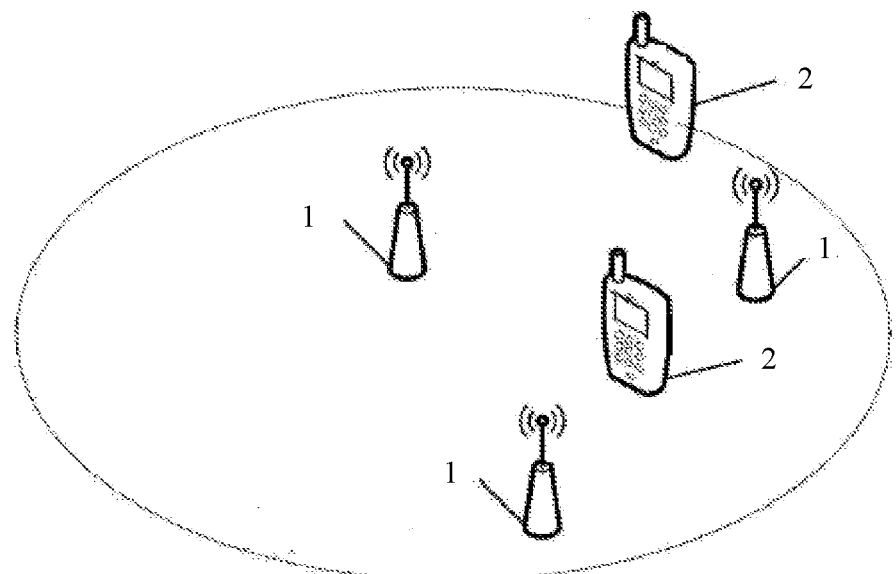
FIG. 2 is a schematic diagram of a possible application scenario of the present invention.

FIG. 2 is a schematic diagram of a possible application scenario of the present invention. As shown in FIG. 2, the scenario includes an LBS device and UE deployed at a specified location, in other words, a location of each UE is known. When a wireless positioning feature library is constructed, the UE deployed at the specified location reports a measurement report to the LBS device, where the measurement report carries cell information and an RSSI of the UE; and the LBS device uses, as training data, cell information and an RSSI that are carried in a measurement report reported by each UE. The LBS device constructs the wireless positioning feature library based on all pieces of training data and according to a method in embodiments of the present invention.

The UE used in this application may include various handheld devices, in-vehicle devices, wearable devices, or computing devices with a wireless communications function, or other processing devices connected to a wireless modem, and various forms of user equipments (UE), mobile stations (MS), terminals, terminal devices, and the like. For ease of description, in this application, the devices mentioned above are collectively referred to as user equipment or UE. The LBS device used in the present invention is an apparatus that is deployed in a radio access network and that is configured to provide a wireless positioning function for the UE. The LBS device may include various forms of macro base stations, micro base stations, relay stations, access points, and the like. The LBS device may also include various service servers that perform wireless communication with the UE directly or by using a base station.

A method for constructing a wireless positioning feature library in embodiments of the present invention is described below in detail with reference to the accompanying drawings.

Figure 3:
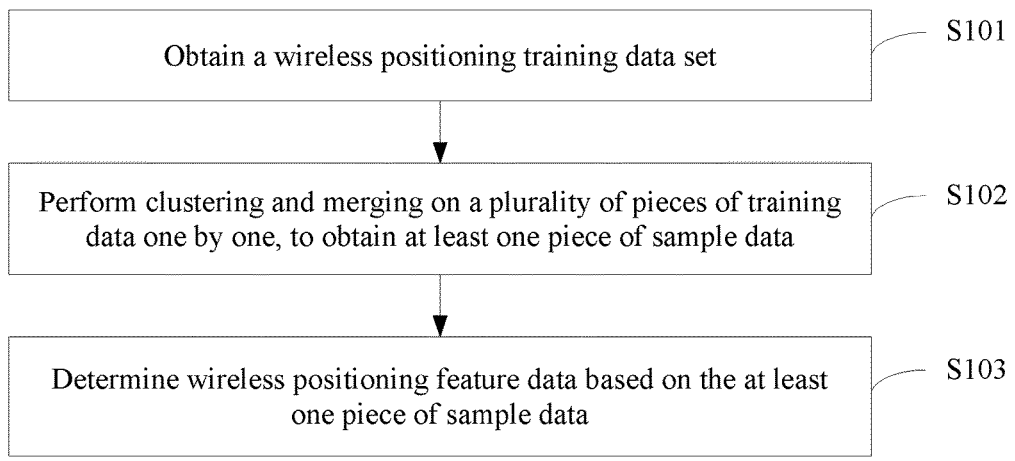
FIG. 3 is a flowchart of a method for constructing a wireless positioning feature library according to an embodiment of the present invention.

FIG. 3 is a flowchart of a method for constructing a wireless positioning feature library according to an embodiment of the present invention. The method shown in FIG. 3 includes the following steps.

S101. An LBS device obtains a wireless positioning training data set.

Figure 1:
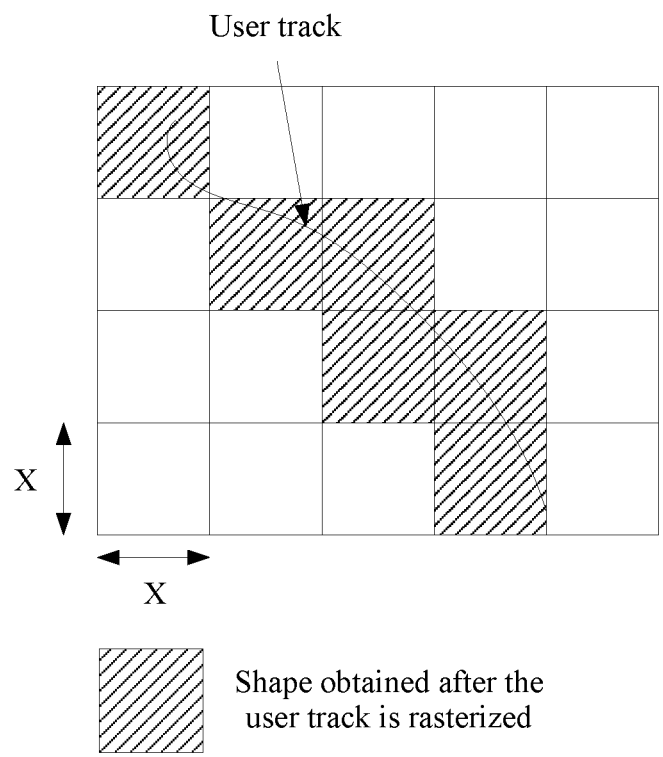
FIG. 1 is a schematic diagram of indicating a user track by using rasters in the prior art.

In the scenario shown in FIG. 1, the LBS device receives a measurement report reported by UE deployed at each specified location, and determines each piece of training data based on cell information and an RSSI in the measurement report. All pieces of training data constitute the wireless positioning training data set.

TABLE 1

| Wireless positioning training data set |
|---|
| Wireless positioning training data set |
| (Lon1, Lat1) (<C1, RSS1>, <C2, RSS2>, . . . , <Cn, RSSn>) |
| (Lon2, Lat2) (<C1, RSS1>, <C2, RSS2>, . . . , <Cm, RSSm>) |
| . . . |
| (Loni, Lati) (<C1, RSS1>, <C2, RSS2>, . . . , <Ck, RSSk>) |

Table 1 shows an example of a wireless positioning training data set. The wireless positioning training data set includes a plurality of pieces of training data. Each piece of training data (Loni, Lati) (<C1, RSS1>, <C2, RSS2>, . . . , <Ck, RSSk>) includes location data (Loni, Lati), a cell identifier Ck of at least one cell, and a received signal strength indicator RSSk that is in a one-to-one correspondence with the cell identifier. In the location data (Loni, Lati), Loni is longitude, and Lati is latitude. In <Ck, RSSk>, Ck is a cell identifier, and RSSk is an RSSI of a cell Ck.

The RSSI may be received signal code power (RSCP) in a 3rd-Generation Universal Mobile Telecommunications System (3G UMTS), or may be reference signal received power (RSRP) in an LTE network.

S102. The LBS device performs clustering and merging on the plurality of pieces of training data one by one, to obtain at least one piece of sample data.

S103. The LBS device determines wireless positioning feature data based on the at least one piece of sample data.

In step S102, the LBS device performs clustering and merging on training data in the training data set based on sample data in a sample data set. An initial sample data set may be empty, or may include at least one piece of sample data.

Optionally, the sample data includes location data, at least one cell identifier, and an RSSI that is in a one-to-one correspondence with the at least one cell identifier. The sample data further includes an accumulation count of the location data and an accumulation count of an RSSI of each cell.

In S102, performing, by the LBS device, merging on training data in the training data set is performing clustering and merging on sample data with relatively high similarity.

Optionally, that the LBS device performs clustering and merging on any piece of training data A in the training data set includes the following steps (1) to (4).

(1) When a preset sample data set includes at least one sample data set, the LBS device determines, from the at least one piece of sample data, sample data that falls within a preset range of the training data A.

Optionally, the LBS device may calculate a distance between sample data and the training data A based on location data in the sample data and location data in the training data A, and then determine whether the sample data falls within the preset range of the training data A.

It should be noted that the location data in the training data and the location data in the sample data that are used in the present invention are obtained based on a GPS. Positioning data measured by the GPS may include a specific error. Therefore, when the LBS device performs merging on the training data, the LBS device may perform clustering and merging on training data with relatively high similarity within an error range of the training data. Therefore, a value of the preset range is a value within an error range of the GPS.

In this implementation of the present invention, clustering and merging are performed on training data within the positioning error range of the training data. Therefore, not only impact of a GPS positioning error on precision of a wireless positioning feature library can be eliminated, but also radio signal fading can be resisted. In addition, fingerprint information of different attributes in a radio environment is completely retained.

Figure 4:
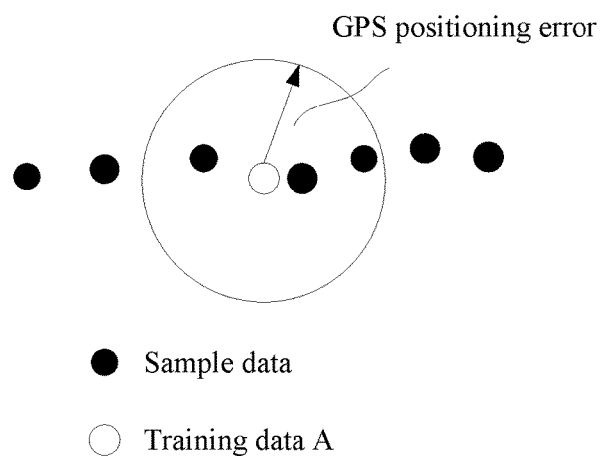
FIG. 4 is a schematic diagram of determining sample data that falls within a preset range of training data A.

In an example shown in FIG. 4, an error range of a positioning system is between 10 and 30 meters, and a value of the preset range in this embodiment of the present invention is 20 meters. The LBS device determines, from all pieces of sample data based on location data in all the pieces of sample data and the location data in the training data A, sample data whose distance from the training data A does not exceed 20 meters. For example, in FIG. 4, sample data in a circle range is sample data that falls within a positioning error range (20 meters) of the training data A.

(2) The LBS device determines, from the sample data that falls within the preset range of the training data A, sample data B with highest similarity to the training data A.

(3) The LBS device merges the training data A and the sample data B to form new sample data C.

(4) The LBS device replaces the sample data B in the sample data set with the sample data C.

In addition, when the preset sample data set is empty, the LBS device determines the training data A as new sample data D, and adds the new sample data D to the sample data set.

In the solution in this embodiment of the present invention, when the sample data set includes the at least one piece of sample data, after the LBS device determines, from the at least one piece of sample data in the sample data set, the sample data that falls within the preset range of the training data A, the LBS device further determines to-be-merged sample data from the sample data that falls within the preset range of the training data A. A ratio of a quantity of same cell identifiers included in the to-be-merged sample data and the training data A to a total quantity of cell identifiers included in the training data A is greater than or equal to a first preset threshold.

If the sample data that falls within the preset range of the training data A and that is determined by the LBS device from the at least one piece of sample data is empty, or if the to-be-merged sample data determined by the LBS device from the sample data that falls within the preset range of the training data A, the LBS device determines the training data A as the new sample data D, and adds the new sample data D to the sample data set.

If the LBS device determines at least one piece of to-be-merged sample data from the sample data that falls within the preset range of the training data A, the LBS device determines, from the at least one piece of to-be-merged sample data, the sample data B with the highest similarity to the training data B.

When implementing the solution in this embodiment of the present invention, the LBS device may determine similarity between training data and sample data by using various possible similarity measurement methods. In a specific example of the present invention, the LBS device uses a root mean square to indicate the similarity between the training data and the sample data.

A method for calculating, by the LBS device, similarity between any piece of training data and any piece of sample data includes:

calculating, by the LBS device, a root mean square of the training data and the sample data according to a formula $$RMS = \sqrt{\frac{\sum_{i=1}^{m}\left(\frac{sumRSSI_i}{sumM_i} - Rssi_i\right)^2}{m}},$$

where a smaller root mean square value indicates higher similarity between the training data and the sample data.

In the formula, $Rssi_i$ is an RSSI of an $i^{th}$ cell in the training data, $sumRSSI_i$ is an RSSI of an $i^{th}$ cell in the sample data, $sumM_i$ is an accumulation count in the sample data, and m is a quantity of same cell identifiers included in the training data and the sample data.

After calculating similarity between the training data A and each piece of to-be-merged sample data by using the foregoing formula, the LBS device selects, from all pieces of to-be-merged sample data, sample data with highest similarity to the training data A as the sample data B.

The LBS device determines whether the similarity between the training data A and the sample data B is greater than or equal to a second preset threshold. If the similarity between the training data A and the sample data B is greater than or equal to the second preset threshold, the LBS device merges the training data A and the sample data B to form the new sample data C; or if the similarity between the training data A and the sample data B is less than the second preset threshold, the LBS device determines the training data A as the new sample data D, and adds the new sample data D to the sample data set.

When the LBS device uses a root mean square to indicate the similarity between the training data A and the sample data B, if a root mean square value calculated based on the training data A and the sample data B is less than or equal to a specified threshold, it indicates that the similarity between the training data A and the sample data B is greater than or equal to the second preset threshold. In this case, the LBS device merges the training data A and the sample data B to form the new sample data C.

Optionally, that the LBS device merges the training data A and the sample data B to form new sample data C includes the following steps (1) to (3):

(1) The LBS device adds the location data in the training data A and location data in the sample data B together, to obtain location data in the sample data C.

(2) The LBS device correspondingly adds RSSIs corresponding to a same cell identifier in the training data A and the sample data B together, and keeps an RSSI corresponding to a different cell identifier in the training data A and the sample data B unchanged, to obtain an RSSI of each cell of the sample data C.

(3) The LBS device increases, by 1, an accumulation count of the received signal strength indicators corresponding to the same cell identifier included in the training data A and the sample data B, keeps an accumulation count of a received signal strength indicator corresponding to a cell identifier that is included only in the sample data B unchanged, records, as 1, an accumulation count of a received signal strength indicator corresponding to a cell identifier that is included only in the training data A, and increases, by 1, an accumulation count corresponding to the location data, to separately obtain an accumulation count of the received signal strength indicator of each cell and an accumulation count of the location data in the sample data C.

For example, the training data A is (Lona, Lata) (<C1, RSS1a>, <C2, RSS2a>, <C3, RSS3a>, <C4, RSS4a>), the sample data B is (Lonb, Latb, x1) C1 (RSS1b, x2), C2 (RSS2b, x3), C3 (RSS3b, x4), C5 (RSS3b, x5), and the sample data C obtained by merging the training data A and the sample data B is (Lona+Lonb, Lata+Latb, x1+1) C1 (RSS1a+RSS1b, x2+1), C2 (RSS2a+RSS2b, x3+1), C3 (RSS3a+RSS3b, x4+1), C4 (RSS4a, 1), C5 (RSS3b, x5).

It should be noted that when the preset sample data set is empty, or when the sample data that falls within the preset range of the training data A and that is determined by the LBS device from the at least one piece of sample data is empty, or when the to-be-merged sample data determined by the LBS device from the at least one piece of sample data is empty, or when the similarity between the training data A and the sample data B is less than the second preset threshold, the LBS device determines the training data A as the new sample data D. Location data, a cell identifier, and an RSSI corresponding to the cell identifier in the sample data D are all the same as those in the training data A, and both an accumulation count of the location data and an accumulation count of an RSSI of each cell in the sample data D are recorded as 1.

After the LBS device performs clustering and merging on all the pieces of training data in the positioning training data set according to the foregoing method for performing clustering and merging on training data, the LBS device outputs sample data included in the sample data set, and output data is wireless positioning feature data.

Optionally, that the LBS device outputs wireless positioning feature data based on sample data in the sample data set includes:

for each piece of sample data, dividing location data in the sample data by an accumulation count corresponding to the location data, to obtain location data in wireless positioning feature data corresponding to the sample data; and for each piece of sample data, dividing an RSSI corresponding to each cell identifier in the sample data by an accumulation count corresponding to each cell, to obtain an RSSI of each cell in the wireless positioning feature data corresponding to the sample data.

To further describe a method for constructing a wireless positioning feature library in embodiments of the present invention, the present invention further provides a specific example of constructing a wireless positioning feature library.

A data format of training data is set to (Loni, Lati) (<C1, RSS1>, <C2, RSS2>, ..., <Ck, RSSk>), where Loni is longitude, Lati is latitude, C1, ..., and Ck are cell identifiers, and RSS1, ..., and RSSk are RSSIs that are in one-to-one correspondence with the cell identifiers.

A data format of sample data is set as shown in Table 2.

TABLE 2

Format of sample data

| Sample data (Sample) | Location information | Cell RSS information |
| --- | --- | --- |
| Sample 1 | sumLon1, sumLat1, sumN1 | (Cli, sumRSSIi, sumMi) i = 1~Num of Cell in Sample 1 |
| Sample 2 | sumLon2, sumLat2, sumN2 | (Cli, sumRSSIi, sumMi) i = 1~Num of Cell in Sample 2 |
| ... | ... | ... |
| Sample n | sumLonn, sumLatn, sumNn | (Cli, sumRSSIi, sumMi) i = 1~Num of Cell in Sample n1 |

In Table 2, sumLon indicates an accumulated sum of longitude in sample data sample n, sumLatn indicates an accumulated sum of latitude in the sample data sample n, sumNn indicates an accumulation count of the longitude/latitude, Cli is a cell identifier, sumRSSIi indicates an accumulated sum of RSSIs of a cell Cli, and sumMi indicates an accumulation count of the RSSIs of the cell Cli.

It is assumed that a training data set includes five pieces of training data, and formats of the five pieces of training data are as follows:

The five pieces of training data are respectively:
training data 1:
(2, 1) (<C1, −60>, <C2, −75>, <C3, −90>);
training data 2:
(3, 2) (<C1, −60>, <C2, −70>, <C3, −92>);
training data 3:
(7, 6) (<C1, −60>, <C2, −70>, <C3, −95>);
training data 4:
(3, 3) (<C1, −90>, <C2, −100>, <C3, −105>); and
training data 5:
(3, 3) (<C4, −60>, <C5, −70>, <C6, −95>).

Further, it is assumed that a positioning error of the training data is 2, similarity between training data and sample data is indicated by using a root mean square, and when a root mean square value between the training data and the sample data is less than or equal to a threshold, it is determined that the similarity between the training data and the sample data meets a merging requirement. It is assumed that a value of the threshold is 4, and initial sample data is empty.

Step 1: An LBS device sequentially performs clustering and merging on all pieces of training data.

(1) The LBS device randomly obtains a first piece of training data, for example, the training data 1.

The LBS device determines that sample data that falls within a positioning error range of the training data 1 is empty, and the LBS device stores the training data 1 in a sample data set as sample data 1. The sample data 1 is stored as:

sample 1 (2, 1, 1) C1 (−60, 1), C2 (−75, 1), C3 (−90, 1).

(2) The LBS device obtains a second piece of training data, for example, the training data 2.

Figure 5:
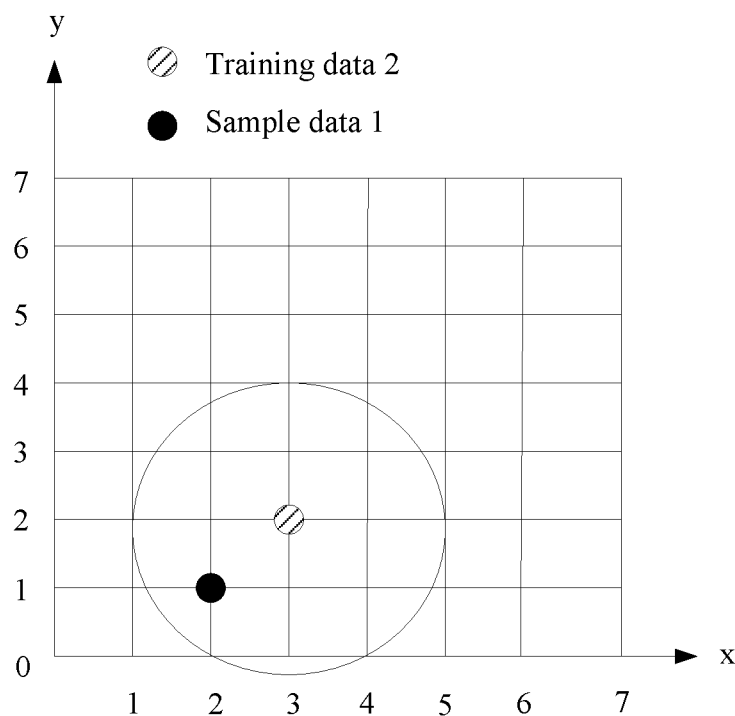
FIG. 5 is a schematic distribution diagram of training data 2 and sample data 1.

As shown in FIG. 5, the sample data 1 (sample 1) falls within a positioning error range of the training data 2. The LBS device calculates similarity between the sample 1 and the training data 2.

The LBS device calculates the similarity between the sample 1 and the training data 2 according to the following formula:

$$RMS = \sqrt{\frac{\sum_{i=1}^{m}\left(\frac{sumRSSI_i}{sumM_i} - Rssi_i\right)^2}{m}} =$$

$$\sqrt{\frac{\left(\frac{-60}{1} - (-60)\right)^2 + \left(\frac{-75}{1} - (-70)\right)^2 + \left(\frac{-90}{1} - (-92)\right)^2}{3}} =$$

$$\sqrt{\frac{0 + (-5)^2 + 2^2}{3}} = 3.1 < 4$$

According to the foregoing formula, a root mean square of the training data 2 and the sample 1 is less than the threshold 4, so that the training data 2 and the sample 1 meet the merging requirement. In this case, the LBS device performs clustering and merging on the training data 2 and the sample 1. The LBS device calculates a sum of locations of the training data 2 and the sample 1, and calculates a sum of received signal strength of each same cell in the training data 2 and the sample 1. New sample data sample 1 obtained after the merging is (5, 3, 2) C1 (−120, 2), C2 (−145, 2), C3 (−182, 2).

Figure 6:
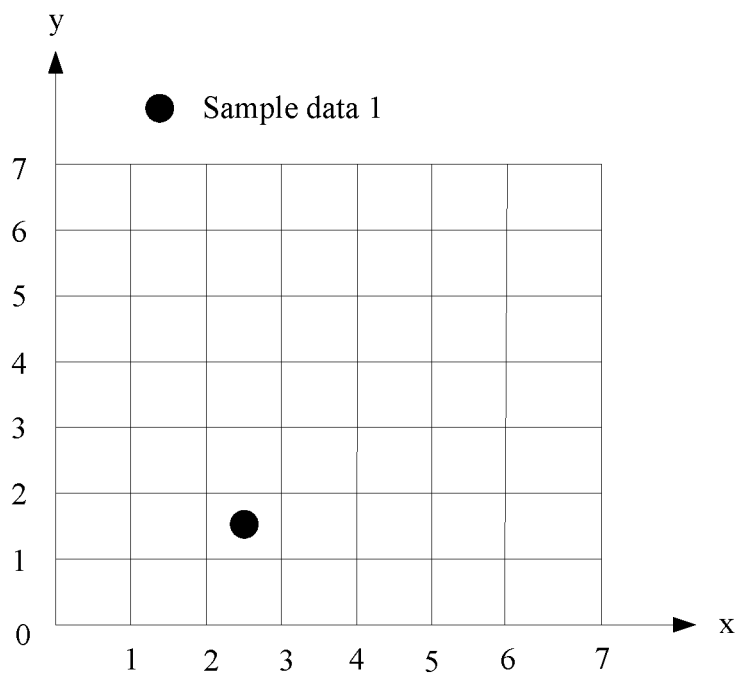
FIG. 6 is a schematic distribution diagram of new sample data 1 obtained by merging training data 1 and sample data 1.

As shown in FIG. 6, a location of the new sample 1 is (5/2, 3/2)=(2.5, 1.5).

(3) The LBS device obtains a third piece of training data, for example, the training data 3.

Figure 7:
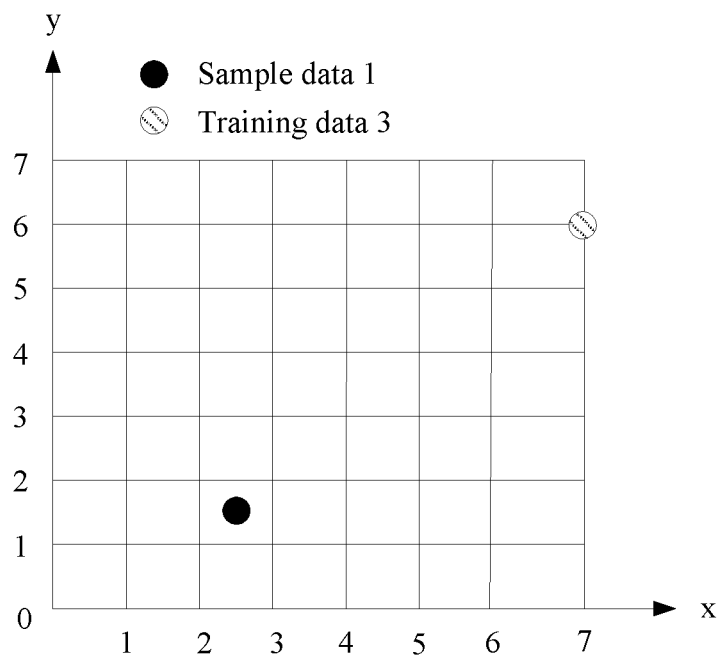
FIG. 7 is a schematic distribution diagram of sample data 1 and sample data 2.

As shown in FIG. 7, no sample data falls within a positioning error range of the training data 3. The LBS device stores the training data 3 as new sample data sample 2 (7, 6, 1) C1 (−60, 1), C2 (−70, 1), C3 (−95, 1).

(4) The LBS device obtains a fourth piece of training data, for example, the training data 4.

Figure 8:
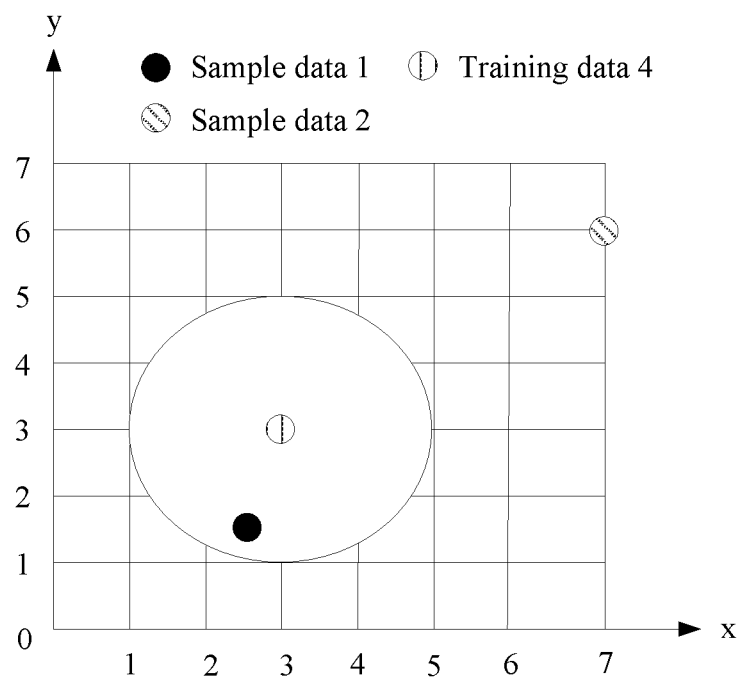
FIG. 8 is a schematic distribution diagram of training data 4, sample data 1, and sample data 2.

As shown in FIG. 8, the sample data sample 1 falls within a positioning error range of the training data 4.

The LBS device calculates a root mean square of the training data 4 and the sample 1 according to the following formula:

$$RMS = \sqrt{\frac{\sum_{i=1}^{m}\left(\frac{sumRSSI_i}{sumM_i} - Rssi_i\right)^2}{m}} =$$

$$\sqrt{\frac{\left(\frac{-120}{2} - (-90)\right)^2 + \left(\frac{-145}{2} - (-100)\right)^2 + \left(\frac{-182}{2} - (-105)\right)^2}{3}} =$$

$$\sqrt{\frac{30^2 + (27.5)^2 + 14^2}{3}} > 4$$

According to the foregoing formula, it can be learned that the root mean square of the training data 4 and the sample 1 is greater than the threshold 4, in other words, the training data 4 and the sample 1 do not meet the merging requirement. In this case, the LBS device stores the training data 4 as new sample data sample 3 (3, 3, 1) C1 (−90, 1), C2 (−100, 1), C3 (−105, 1).

(5) The LBS device obtains the training data 5.

Figure 9:
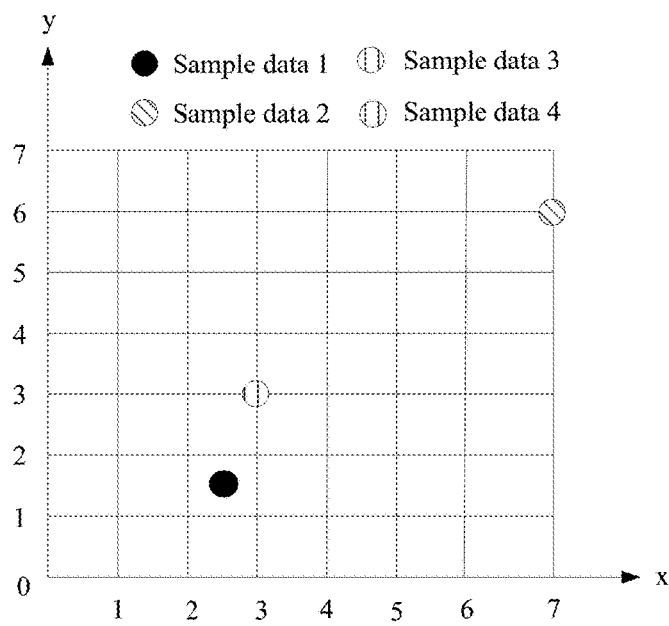
FIG. 9 is a schematic distribution diagram of sample data 1, sample data 2, sample data 3, and sample data 4.

As shown in FIG. 9, the sample 1 and the sample 3 fall within a positioning error range of the training data 5. Because all cell identifiers included in the training data 5 are different from all cell identifiers included in the sample 1 or the sample 3, so that the training data 5 and the sample 1 or the sample 3 do not meet an RMS calculation condition. In this case, the LBS device directly stores the training data 5 as new sample data sample 4 (3, 3, 1) C4 (−60, 1), C5 (−70, 1), C6 (−95, 1).

A sample data set obtained after a clustering and merging calculation is separately performed on the training data 1 to the training data 5 is:

sample 1 (5, 3, 2) C1 (−120, 2), C2 (−145, 2), C3 (−182, 2);
sample 2 (7, 6, 1) C1 (−60, 1), C2 (−70, 1), C3 (−95, 1);
sample 3 (3, 3, 1) C1 (−90, 1), C2 (−100, 1), C3 (−105, 1); and
sample 4 (3, 3, 1) C4 (−60, 1), C5 (−70, 1), C6 (−95, 1).

Step 2: The LBS device outputs each piece of sample data included in a sample data set, to obtain each piece of wireless positioning feature data.

That the LBS device outputs wireless positioning feature data based on sample data includes:

location data in the wireless positioning feature data is:

$$Lon = \frac{sumLon}{sumN}$$

$$Lat = \frac{sumLat}{sumN};$$

and an RSSI of each cell in the wireless positioning feature data is:

$$RSSI = \frac{sumRSSI}{sumM}.$$

According to the foregoing formulas, wireless positioning feature data obtained by the LBS device by outputting the sample data 1 to the sample data 4 is:

feature data 1: (2.5, 1.5) C1 (−60), C2 (−72.5), C3 (−91);
feature data 2: (7, 6) C1 (−60), C2 (−70), C3 (−95);
feature data 3: (3, 3) C1 (−90), C2 (−100), C3 (−105); and
feature data 4: (3, 3) C4 (−60), C5 (−70), C6 (−95).

It can be learned from the foregoing formula for calculating location data in wireless positioning feature data that, according to the law of large numbers, larger sumN indicates that obtained location data can better reflect a real location of sample data, so that a positioning error of a positioning system such as a GPS is eliminated. It can be learned from the foregoing formula for calculating an RSSI of each cell in wireless positioning feature data, larger sumM indicates that RSSIs of a same cell are accumulated for a plurality of times and then an average is calculated, so that RSSI fluctuation can be eliminated, and signal fading can be resisted.

Figure 10:
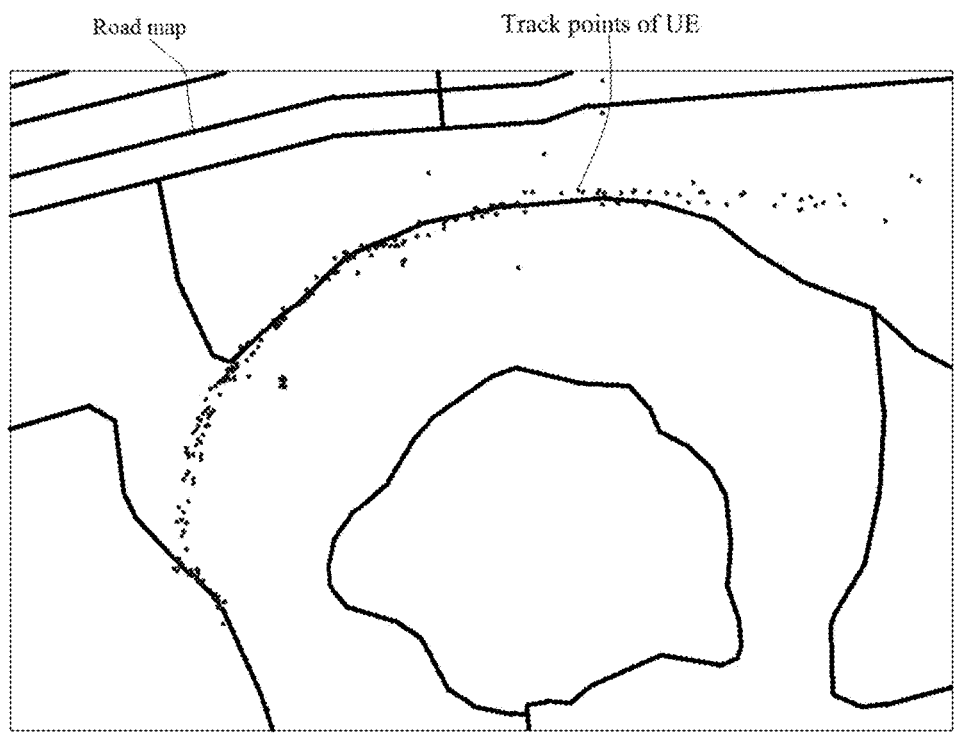
FIG. 10 is a schematic diagram of a scenario in which UE is moving.

FIG. 10 is a schematic diagram of a scenario in which UE is moving. FIG. 10 shows real moving track points of the UE, and each moving track point is corresponding to one piece of positioning data.

Figure 11:
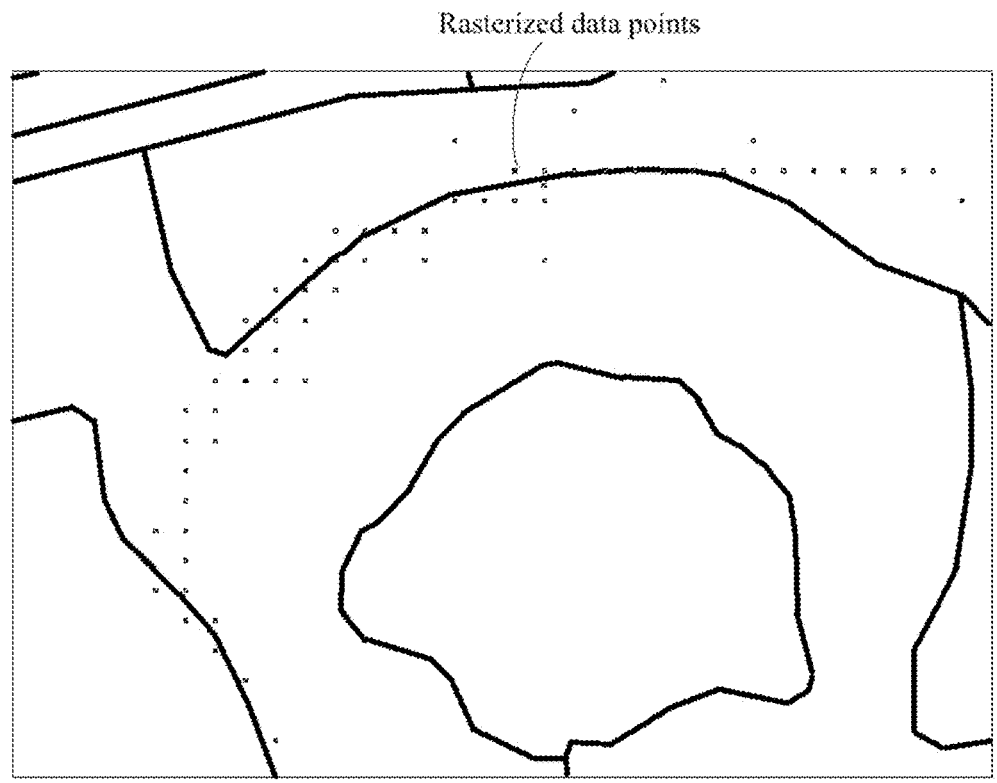
FIG. 11 is a schematic diagram obtained after moving track points in FIG. 10 are rasterized by using a prior-art rasterization policy.

FIG. 11 is a schematic diagram obtained after the moving track points in FIG. 10 are rasterized by using a prior-art rasterization policy. It can be seen from FIG. 11 that severe distortion of a location and a moving track of the UE is caused after the moving track points of the UE are merged by using rasters.

Figure 12:
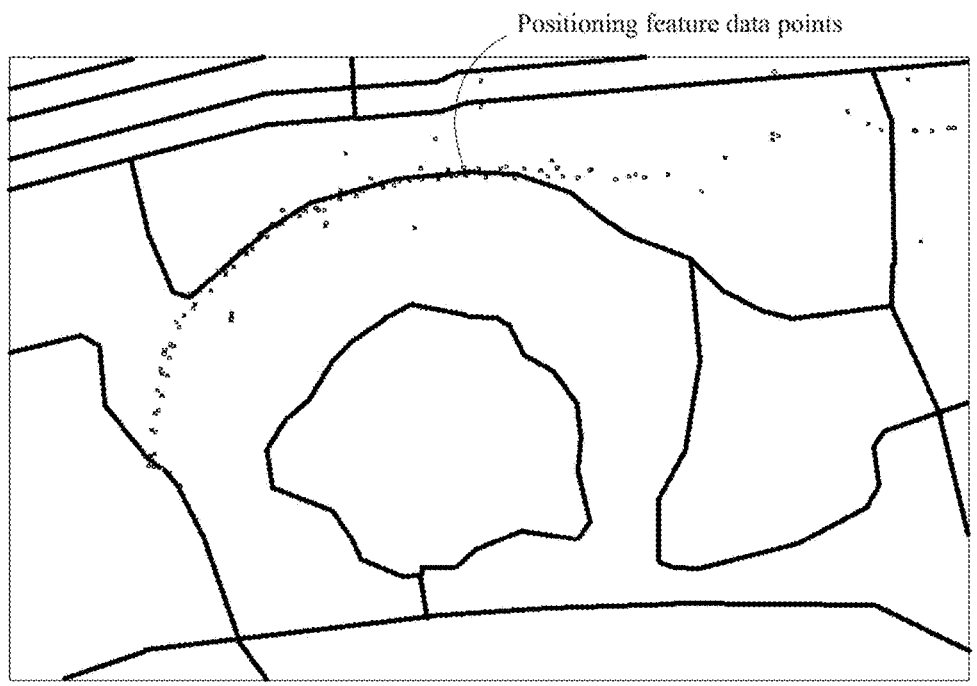
FIG. 12 is a schematic diagram obtained after clustering and merging are performed on moving track points in FIG. 10 by using a method in embodiments of the present invention.

FIG. 12 is a schematic diagram obtained after clustering and merging are performed on the moving track points in FIG. 10 by using a method in embodiments of the present invention. In FIG. 11, one small black point indicates one type of sample data, so that a location and a moving track of the UE can be more accurately reflected.

Figure 13:
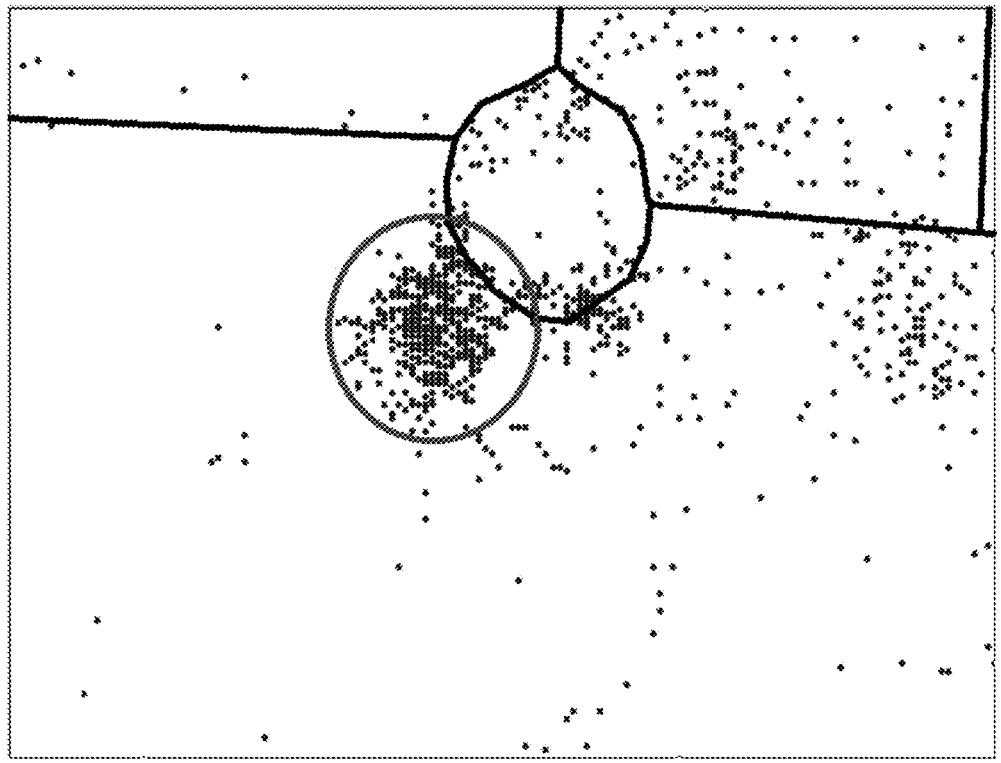
FIG. 13 is a schematic diagram of a scenario in which UE is static.

FIG. 13 is a schematic diagram of a scenario in which UE is static. As shown in FIG. 10, in the scenario in which the UE is static, because GPS positioning drifts, positioning data of UE at a same location may be distributed at different locations. For example, in FIG. 10, small black points in a circle include different static track points finally obtained by positioning the UE at the same location. The different static track points corresponding to the UE at the same location may also be referred to as GPS scatter points.

Figure 14:
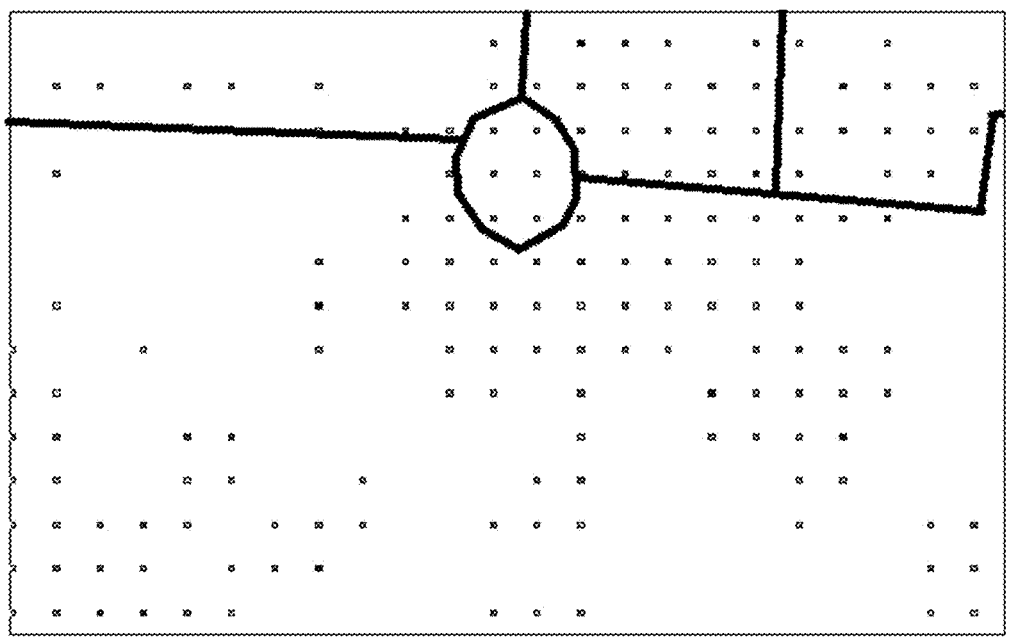
FIG. 14 is a schematic diagram obtained after static track points in FIG. 13 are rasterized by using a prior-art rasterization policy.

FIG. 14 is a schematic diagram obtained after the static track points in FIG. 13 are rasterized by using a prior-art rasterization policy. In FIG. 14, for a raster, static track points that fall within the raster may include a drifted track point that should fall outside the raster and a track point that should fall within the raster. After the track points that fall within the raster are merged, the drifted track point leads to an error in the track point that should fall within the raster. It can be learned that for a feature library constructed by using an existing technical solution, a GPS error is not eliminated, and consequently an error is included in the constructed wireless positioning feature library.

Figure 15:
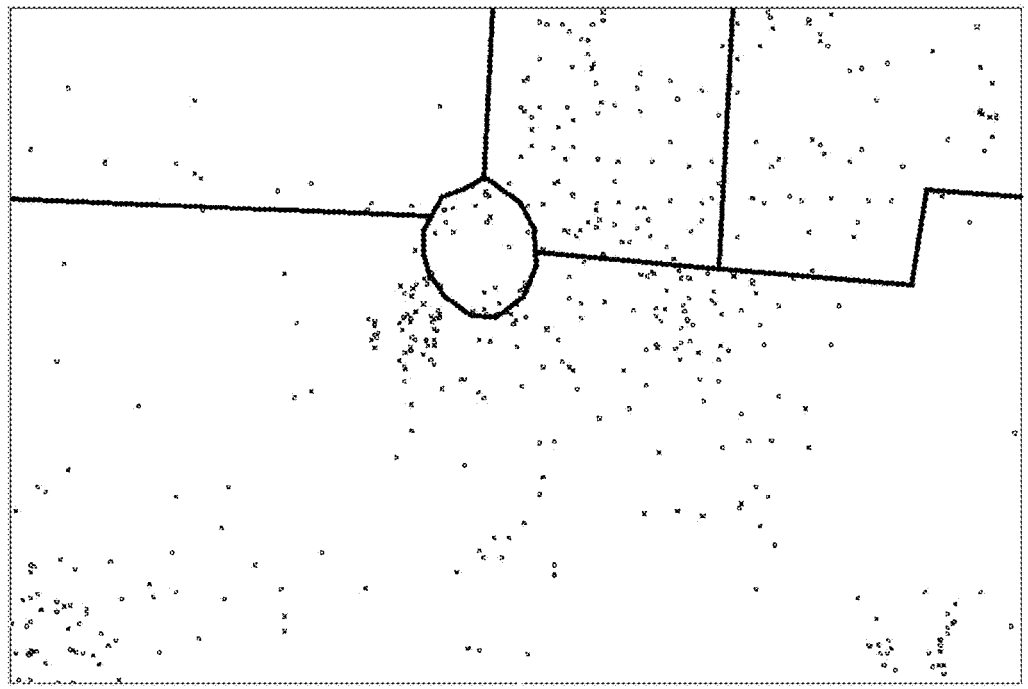
FIG. 15 is a schematic diagram obtained after clustering and merging are performed on static track points in FIG. 13 by using a method in embodiments of the present invention.

FIG. 15 is a schematic diagram obtained after clustering and merging are performed on the static track points in FIG. 13 by using a method in embodiments of the present invention. In FIG. 15, GPS scatter points are merged together, so that positioning data in a wireless positioning feature library is further aggregated, and finally is divided to form several different types of sample data. In FIG. 15, one small black point indicates one type of sample data, so that a GPS error can be eliminated, and further, message redundancy of the feature library can be reduced.

Figure 16:
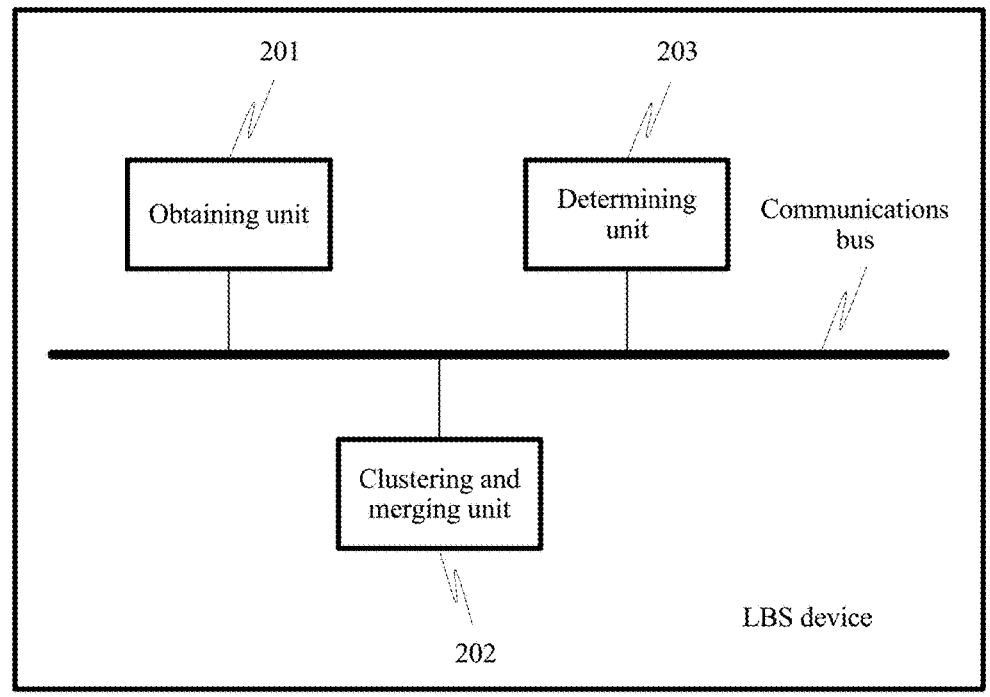
FIG. 16 is a schematic structural diagram of an apparatus for constructing a wireless positioning feature library according to an embodiment of the present invention.

FIG. 16 is a schematic structural diagram of an apparatus for constructing a wireless positioning feature library according to an embodiment of the present invention. As shown in FIG. 16, the apparatus includes an obtaining unit 201, a clustering and merging unit 202, and a determining unit 203.

The obtaining unit 201 is configured to obtain a wireless positioning training data set, where the wireless training data set includes a plurality of pieces of training data.

The clustering and merging unit 202 is configured to perform clustering and merging on the plurality of pieces of training data one by one, to obtain at least one piece of sample data.

The determining unit 203 is configured to determine wireless positioning feature data based on the at least one piece of sample data.

That the clustering and merging unit 202 performs clustering and merging on any piece of training data A in the plurality of pieces of training data includes:

when a preset sample data set includes at least one piece of sample data, determining, from the at least one piece of sample data, sample data that falls within a preset range of the training data A;

determining, from the sample data that falls within the preset range of the training data A, sample data B with highest similarity to the training data A;

merging the training data A and the sample data B to form new sample data C; and replacing the sample data B with the sample data C, and adding the sample data C to the sample data set.

Optionally, the training data and the sample data each include location data, at least one cell identifier, and an RSSI that is in a one-to-one correspondence with the at least one cell identifier.

The sample data further includes an accumulation count of the location data and an accumulation count of an RSSI of each cell.

Optionally, that the clustering and merging unit 202 determines, from the at least one piece of sample data, sample data that falls within a preset range of the training data A includes:

determining, from the at least one piece of sample data based on location data in the at least one piece of sample data and location data in the training data A, the sample data that falls within the preset range of the training data A.

Optionally, after the clustering and merging unit 202 determines, from the at least one piece of sample data, the sample data that falls within the preset range of the training data A, the clustering and merging unit 202 is further configured to:

determine to-be-merged sample data from the sample data that falls within the preset range of the training data A, where a ratio of a quantity of same cell identifiers included in the to-be-merged sample data and the training data A to a total quantity of cell identifiers included in the training data A is greater than or equal to a first preset threshold.

Optionally, that the clustering and merging unit 202 determines, from the sample data that falls within the preset range of the training data A, sample data B with highest similarity to the training data A includes:

determining, from the to-be-merged sample data, the sample data B with the highest similarity to the training data A.

16. The apparatus according to any one of claims 12 to 15, where that the clustering and merging unit 202 determines similarity between sample data and training data includes:

calculating a root mean square of the training data and the sample data according to a formula $$RMS = \sqrt{\frac{\sum_{i=1}^{m}\left(\frac{sumRSSI_i}{sumM_i} - Rssi_i\right)^2}{m}},$$

where a smaller root mean square value indicates higher similarity between the training data and the sample data.

In the formula, $Rssi_i$ is an RSSI of an $i^{th}$ cell in the training data, $sumRSSI_i$ is an RSSI of an $i^{th}$ cell in the sample data, $sumM_i$ is an accumulation count in the sample data, and m is a quantity of same cell identifiers included in the training data and the sample data.

Optionally, that the clustering and merging unit 202 merges the training data A and the sample data B to form new sample data C includes:

determining whether the similarity between the training data A and the sample data B is greater than or equal to a second preset threshold; and when the similarity between the training data A and the sample data B is greater than or equal to the second preset threshold, merging the training data A and the sample data B to form the new sample data.

Optionally, that the clustering and merging unit 202 merges the training data A and the sample data B to form new sample data C includes:

adding the location data in the training data A and location data in the sample data B together, to obtain location data in the sample data C;

correspondingly adding RSSIs corresponding to a same cell identifier in the training data A and the sample data B together, and keeping an RSSI corresponding to a different cell identifier in the training data A and the sample data B unchanged, to obtain an RSSI of each cell of the sample data C; and increasing, by 1, an accumulation count of the received signal strength indicators corresponding to the same cell identifier included in the training data A and the sample data B, keeping an accumulation count of a received signal strength indicator corresponding to a cell identifier that is included only in the sample data B unchanged, recording, as 1, an accumulation count of a received signal strength indicator corresponding to a cell identifier that is included only in the training data A, and increasing, by 1, an accumulation count corresponding to the location data, to separately obtain an accumulation count of the received signal strength indicator of each cell and an accumulation count of the location data in the sample data C.

Optionally, when the preset sample data set is empty, or when the sample data that falls within the preset range of the training data A and that is determined from the at least one piece of sample data is empty, or when all cell identifiers included in the sample data that falls within the preset range of the training data A and that is determined from the at least one piece of sample data are different from all cell identifiers in the training data A, the clustering and merging unit 202 is further configured to:

determine the training data A as new sample data D, where location data, a cell identifier, and an RSSI corresponding to the cell identifier in the sample data D are all the same as those in the training data A, and both an accumulation count of the location data and an accumulation count of an RSSI of each cell in the sample data D are recorded as 1.

Optionally, that the determining unit 203 determines wireless positioning feature data based on the at least one piece of sample data includes:

for each piece of sample data, dividing location data in the sample data by an accumulation count corresponding to the location data, to obtain location data in wireless positioning feature data corresponding to the sample data; and for each piece of sample data, dividing an RSSI corresponding to each cell identifier in the sample data by an accumulation count corresponding to each cell, to obtain an RSSI of each cell in the wireless positioning feature data corresponding to the sample data.

In FIG. 16, the units in the apparatus for constructing a wireless positioning feature library may be connected to each other by using a communications bus. Although not shown in the figure, the units in the device may alternatively be connected in another connection manner. This is not limited in this embodiment of the present invention.

In another embodiment of the present invention, in terms of hardware implementation, the obtaining unit 201, the clustering and merging unit 202, and the determining unit 203 may be merged to form a function module that is built in or independent of, in a form of hardware, a processor in the apparatus for constructing a wireless positioning feature library, or may be stored in a memory in the apparatus in a form of software, so that the processor invokes and performs an operation corresponding to each of the foregoing modules.

In the present invention, based on similarity, training data is controlled to be merged with a sample data within a GPS error range of the training data, and an average of longitude/latitude is calculated and an average of cell levels is calculated only for a sample data with relatively high similarity to the training data. Based on fingerprint library information obtained in the present invention, not only impact of a GPS deviation on precision of a fingerprint library can be eliminated, but also radio signal fading can be resisted. In addition, fingerprint information of different attributes in a radio environment is completely retained.

A processor configured to implement functions of the foregoing LBS device in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits that are described with reference to the content disclosed in the present invention. The processor may alternatively be a combination for implementing a computing function, for example, a combination including one or more microprocessors, or a combination of a DSP and a microprocessor.

The method or algorithm steps described with reference to the content disclosed in the present invention may be implemented in a hardware manner, or may be implemented in a manner of executing a software instruction by a processor. The software instruction may include a corresponding software module. The software module may be stored in a random access memory (RAM) memory, a flash memory, a read-only memory (ROM) memory, an erasable programmable read-only memory (EPROM) memory, an electrically erasable programmable read-only memory (EEPROM) memory, a register, a hard disk, a removable hard disk, a compact disc read-only memory (CD-ROM), or a storage medium in any other forms well-known in the art. An example storage medium is coupled to the processor, so that the processor can read information from the storage medium, and can write information into the storage medium. Certainly, the storage medium may be a part of the processor. The processor and the storage medium may be located in an ASIC. In addition, the ASIC may be located in UE. Certainly, the processor and the storage medium may exist in the UE as discrete assemblies.

A person skilled in the art should be aware that in the foregoing one or more examples, the functions described in the present invention may be implemented by hardware, software, firmware, or any combination thereof. When the functions are implemented by software, these functions may be stored in a computer readable medium or transmitted as one or more instructions or code in the computer readable medium. The computer readable medium includes a computer storage medium and a communications medium. The communications medium includes any medium that enables a computer program to be transmitted from one place to another place. The storage medium may be any available medium accessible to a general-purpose or dedicated computer.

Objectives, technical solutions, and beneficial effects of the present invention are further described in detail in the foregoing exemplary implementations. It should be understood that the foregoing descriptions are merely exemplary implementations of the present invention, and are not intended to limit the protection scope of the present invention. Any modification, equivalent replacement, improvement, or the like made based on technical solutions in the present invention may fall within the protection scope of the present invention.

Additionally, statements made herein characterizing the invention refer to an embodiment of the invention and not necessarily all embodiments.

What is claimed is:

1. A method for constructing a wireless positioning feature library, comprising:

obtaining, by an apparatus, a wireless positioning training data set, wherein the wireless positioning training data set comprises a plurality of pieces of training data;

performing, by the apparatus, clustering and merging on the plurality of pieces of training data one by one, to obtain at least one new piece of sample data; and determining, by the apparatus, wireless positioning feature data based on the at least one new piece of sample data;

wherein performing clustering and merging on a piece of training data A of the plurality of pieces of training data comprises:

determining, from at least one piece of sample data of a sample data set, sample data that falls within a preset range of the piece of training data A;

determining, from the sample data that falls within the preset range of the piece of training data A, sample data B with highest similarity to the piece of training data A;

merging the piece of training data A and the sample data B to form new sample data C; and replacing the sample data B with the new sample data C in the sample data set.

2. The method according to claim 1, wherein the training data and the sample data each comprise location data, at least one cell identifier, and a received signal strength indicator that is in a one-to-one correspondence with the at least one cell identifier; and wherein the sample data further comprises an accumulation count of location data and an accumulation count of received signal strength indicators of each cell.

3. The method according to claim 2, wherein determining the sample data that falls within the preset range of the piece of training data A is based on location data in the at least one piece of sample data and location data in the piece of training data A.

4. The method according to claim 2, wherein after determining the sample data that falls within the preset range of the piece of training data A, the method further comprises:
determining to-be-merged sample data from the sample data that falls within the preset range of the piece of training data A, wherein a ratio of a quantity of same cell identifiers comprised in the to-be-merged sample data and the piece of training data A to a total quantity of cell identifiers comprised in the piece of training data A is greater than or equal to a first preset threshold.

5. The method according to claim 4, wherein the sample data B with highest similarity to the piece of training data A is determined from the to-be-merged sample data.

6. The method according to claim 2, wherein determining similarity between sample data and training data comprises:
calculating a root mean square of the training data and the sample data according to $$RMS = \sqrt{\frac{\sum_{i=1}^{m}\left(\frac{sumRSSI_i}{sumM_i} - Rssi_i\right)^2}{m}},$$

wherein a smaller root mean square indicates higher similarity between the training data and the sample data;
wherein $Rssi_i$ is a received signal strength indicator of an $i^{th}$ cell in the training data, $sumRSS_i$ is a received signal strength indicator of an $i^{th}$ cell in the sample data, $sumM_i$ is an accumulation count in the sample data, and m is a quantity of same cell identifiers comprised in the training data and the sample data.

7. The method according to claim 2, wherein merging the piece of training data A and the sample data B to form the new sample data C comprises:
adding location data in the piece of training data A and location data in the sample data B together, to obtain location data in the new sample data C;
adding received signal strength indicators corresponding to a same cell identifier in the piece of training data A and the sample data B together, and keeping a received signal strength indicator corresponding to a different cell identifier in the piece of training data A and the sample data B unchanged, to obtain a received signal strength indicator of each cell of the new sample data C; and
increasing, by 1, an accumulation count of the received signal strength indicators corresponding to the same cell identifier comprised in the piece of training data A and the sample data B, keeping an accumulation count of a received signal strength indicator corresponding to a cell identifier that is comprised only in the sample data B unchanged, recording, as 1, an accumulation count of a received signal strength indicator corresponding to a cell identifier that is comprised only in the piece of training data A, and increasing, by 1, an accumulation count corresponding to the location data, to separately obtain an accumulation count of the received signal strength indicator of each cell and an accumulation count of the location data in the new sample data C.

8. The method according to claim 2, wherein when the sample data set is empty, or when the sample data that falls within the preset range of the piece of training data A is empty, or when all cell identifiers comprised in the sample data that falls within the preset range of the piece of training data A are different from all cell identifiers in the piece of training data A, or when a ratio of a quantity of same cell identifiers comprised in the sample data that falls within the preset range of the piece of training data A and the piece of training data A to the quantity of cell identifiers comprised in the piece of training data A is less than the first preset threshold, the method further comprises:
determining the piece of training data A as new sample data D, wherein location data, a cell identifier, and a received signal strength indicator corresponding to the cell identifier in the new sample data D are all the same as those in the piece of training data A, and both an accumulation count of the location data and an accumulation count of a received signal strength indicator of each cell in the new sample data D are recorded as 1.

9. The method according to claim 2, wherein the determining the wireless positioning feature data based on the at least one new piece of sample data comprises:
for each piece of sample data, dividing location data in the sample data by an accumulation count corresponding to the location data, to obtain location data in wireless positioning feature data corresponding to the sample data; and
for each piece of sample data, dividing a received signal strength indicator corresponding to each cell identifier in the sample data by an accumulation count of the received signal strength indicator corresponding to each cell identifier, to obtain a received signal strength indicator of each cell in the wireless positioning feature data corresponding to the sample data.

10. The method according to claim 1, wherein merging the piece of training data A and the sample data B to form the new sample data C comprises:
determining whether the similarity between the piece of training data A and the sample data B is greater than or equal to a second preset threshold; and
in response to the similarity between the piece of training data A and the sample data B being greater than or equal to the second preset threshold, merging the piece of training data A and the sample data B to form the new sample data C.

11. An apparatus for constructing a wireless positioning feature library, comprising:
a transceiver;
at least one processor, and
a non-transitory computer-readable storage medium having processor-executable instructions stored thereon;
wherein the processor-executable instructions, when executed by the at least one processor, facilitate:
obtaining, via the transceiver, a wireless positioning training data set, wherein the wireless positioning training data set comprises a plurality of pieces of training data;
performing clustering and merging on the plurality of pieces of training data one by one, to obtain at least one new piece of sample data; and
determining wireless positioning feature data based on the at least one new piece of sample data;

wherein performing clustering and merging on a piece of training data A of the plurality of pieces of training data comprises:
 determining, from at least one piece of sample data of a sample data set, sample data that falls within a preset range of the piece of training data A;
 determining, from the sample data that falls within the preset range of the piece of training data A, sample data B with highest similarity to the piece of training data A;
 merging the piece of training data A and the sample data B to form new sample data C; and
 replacing the sample data B with the new sample data C in the sample data set.

12. The apparatus according to claim 11, wherein the training data and the sample data each comprise location data, at least one cell identifier, and a received signal strength indicator that is in a one-to-one correspondence with the at least one cell identifier; and
 wherein the sample data further comprises an accumulation count of location data and an accumulation count of received signal strength indicators of each cell.

13. The apparatus according to claim 12, wherein determining the sample data that falls within the preset range of the piece of training data A
 is based on location data in the at least one piece of sample data and location data in the piece of training data A.

14. The apparatus according to claim 12, wherein the processor-executable instructions, when executed, further facilitate, after determining the sample data that falls within the preset range of the piece of training data A:
 determining to-be-merged sample data from the sample data that falls within the preset range of the piece of training data A, wherein a ratio of a quantity of same cell identifiers comprised in the to-be-merged sample data and the piece of training data A to a total quantity of cell identifiers comprised in the piece of training data A is greater than or equal to a first preset threshold.

15. The apparatus according to claim 14, wherein the sample data B with highest similarity to the piece of training data A is determined
 from the to-be-merged sample data.

16. The apparatus according to claim 12, wherein determining similarity between sample data and training data comprises:
 calculating a root mean square of the training data and the sample data according to $$RMS = \sqrt{\frac{\sum_{i=1}^{m}\left(\frac{sumRSSI_i}{sumM_i} - Rssi_i\right)^2}{m}},$$

wherein a smaller root mean square value indicates higher similarity between the training data and the sample data;
 wherein $Rssi_i$ is a received signal strength indicator of an $i^{th}$ cell in the training data, $sumRSSI_i$ is a received signal strength indicator of an $i^{th}$ cell in the sample data, $sumM_i$ is an accumulation count in the sample data, and m is a quantity of same cell identifiers comprised in the training data and the sample data.

17. The apparatus according to claim 12, wherein merging the piece of training data A and the sample data B to form the new sample data C comprises:

adding location data in the piece of training data A and location data in the sample data B together, to obtain location data in the new sample data C;
 correspondingly adding received signal strength indicators corresponding to a same cell identifier in the piece of training data A and the sample data B together, and keeping a received signal strength indicator corresponding to a different cell identifier in the piece of training data A and the sample data B unchanged, to obtain a received signal strength indicator of each cell of the new sample data C; and
 increasing, by 1, an accumulation count of the received signal strength indicators corresponding to the same cell identifier comprised in the piece of training data A and the sample data B, keeping an accumulation count of a received signal strength indicator corresponding to a cell identifier that is comprised only in the sample data B unchanged, recording, as 1, an accumulation count of a received signal strength indicator corresponding to a cell identifier that is comprised only in the piece of training data A, and increasing, by 1, an accumulation count corresponding to the location data, to separately obtain an accumulation count of the received signal strength indicator of each cell and an accumulation count of the location data in the new sample data C.

18. The apparatus according to claim 12, wherein the processor-executable instructions, when executed, further facilitate:
 when the sample data set is empty, or when the sample data that falls within the preset range of the piece of training data A is empty, or when all cell identifiers comprised in the sample data that falls within the preset range of the piece of training data A are different from all cell identifiers in the piece of training data A, or when a ratio of a quantity of same cell identifiers comprised in the sample data that falls within the preset range of the piece of training data A and the piece of training data A to the quantity of cell identifiers comprised in the piece of training data A is less than the first preset threshold,
 determining the piece of training data A as new sample data D, wherein location data, a cell identifier, and a received signal strength indicator corresponding to the cell identifier in the new sample data D are all the same as those in the piece of training data A, and both an accumulation count of the location data and an accumulation count of a received signal strength indicator of each cell in the new sample data D are recorded as 1.

19. The apparatus according to claim 11, wherein merging the piece of training data A and the sample data B to form the new sample data C comprises:
 determining whether the similarity between the piece of training data A and the sample data B is greater than or equal to a second preset threshold; and
 in response to the similarity between the piece of training data A and the sample data B being greater than or equal to the second preset threshold, merging the piece of training data A and the sample data B to form the new sample data C.

20. A non-transitory computer-readable medium having processor-executable instructions stored thereon, wherein the processor-executable instructions, when executed, facilitate:

obtaining a wireless positioning training data set, wherein the wireless positioning training data set comprises a plurality of pieces of training data;

performing clustering and merging on the plurality of pieces of training data one by one, to obtain at least one new piece of sample data; and determining wireless positioning feature data based on the at least one new piece of sample data;

wherein performing clustering and merging on a piece of training data A in the plurality of pieces of training data comprises:

determining, from at least one piece of sample data of a sample data set, sample data that falls within a preset range of the piece of training data A;

determining, from the sample data that falls within the preset range of the piece of training data A, sample data B with highest similarity to the piece of training data A;

merging the piece of training data A and the sample data B to form new sample data C; and replacing the sample data B with the new sample data C in the sample data set.

* * * * *